United States Patent
Border et al.

(10) Patent No.: US 6,973,497 B1
(45) Date of Patent: Dec. 6, 2005

(54) SELECTIVE SPOOFER AND METHOD OF PERFORMING SELECTIVE SPOOFING

(75) Inventors: John Border, Germantown, MD (US); Matthew Butehorn, Mt. Airy, MD (US)

(73) Assignee: Hughes Electronics Corporation, El Segundo, CA (US)

(*) Notice: Subject to any disclaimer, the term of this patent is extended or adjusted under 35 U.S.C. 154(b) by 776 days.

(21) Appl. No.: 09/664,165

(22) Filed: Sep. 18, 2000

Related U.S. Application Data

(60) Provisional application No. 60/181,597, filed on Feb. 10, 2000, provisional application No. 60/220,026, filed on Jul. 21, 2000.

(51) Int. Cl.[7] .................................... G06F 13/00
(52) U.S. Cl. ................ 709/228; 709/217; 709/238; 709/249
(58) Field of Search .................. 709/217, 228, 709/238, 249, 219, 223, 224, 225, 226, 227, 709/250

(56) References Cited

U.S. PATENT DOCUMENTS

| | | | | |
|---|---|---|---|---|
| 5,541,911 A | * | 7/1996 | Nilakantan et al. | 370/422 |
| 5,828,468 A | * | 10/1998 | Lee et al. | 358/434 |
| 5,999,274 A | * | 12/1999 | Lee et al. | 358/434 |
| 6,003,084 A | * | 12/1999 | Green et al. | 709/227 |
| 6,006,264 A | * | 12/1999 | Colby et al. | 709/226 |
| 6,076,113 A | * | 6/2000 | Ramanathan et al. | 709/235 |
| 6,178,450 B1 | * | 1/2001 | Ogishi et al. | 709/224 |
| 6,205,481 B1 | * | 3/2001 | Heddaya et al. | 709/226 |
| 6,327,626 B1 | * | 12/2001 | Schroeder et al. | 709/236 |
| 6,484,210 B1 | * | 11/2002 | Adriano et al. | 709/239 |
| 6,591,306 B1 | * | 7/2003 | Redlich | 709/245 |
| 6,701,370 B1 | | 3/2004 | Dillon | 709/230 |

FOREIGN PATENT DOCUMENTS

| | | |
|---|---|---|
| EP | 0 903 905 A2 | 9/1998 |
| FR | 2 778 804 A | 11/1999 |
| WO | WO 95/34153 | 12/1995 |

* cited by examiner

*Primary Examiner*—Viet D. Vu
(74) *Attorney, Agent, or Firm*—Craig Plastrik

(57) ABSTRACT

A method and apparatus for enhancing the performance of a network by performing selective spoofing. Selective spoofing provides the ability to discriminate among different connections and only allocate spoofing resources to those connections for which spoofing will actually improve performance. The selective spoofing functions described are applicable to a wide variety of communication links, including both slow and fast links, high latency links, and links with low and high error rates. The selective spoofing functions may be implemented either alone or in combination with other performance enhancing features, such as, spoofing the conventional TCP three-way handshake, local data acknowledgement, multiplexing multiple connections across a single connection, data compression/encryption, prioritization, and path selection. The selective spoofing features described are particularly useful for links with high latency and/or high bit error rates.

22 Claims, 3 Drawing Sheets

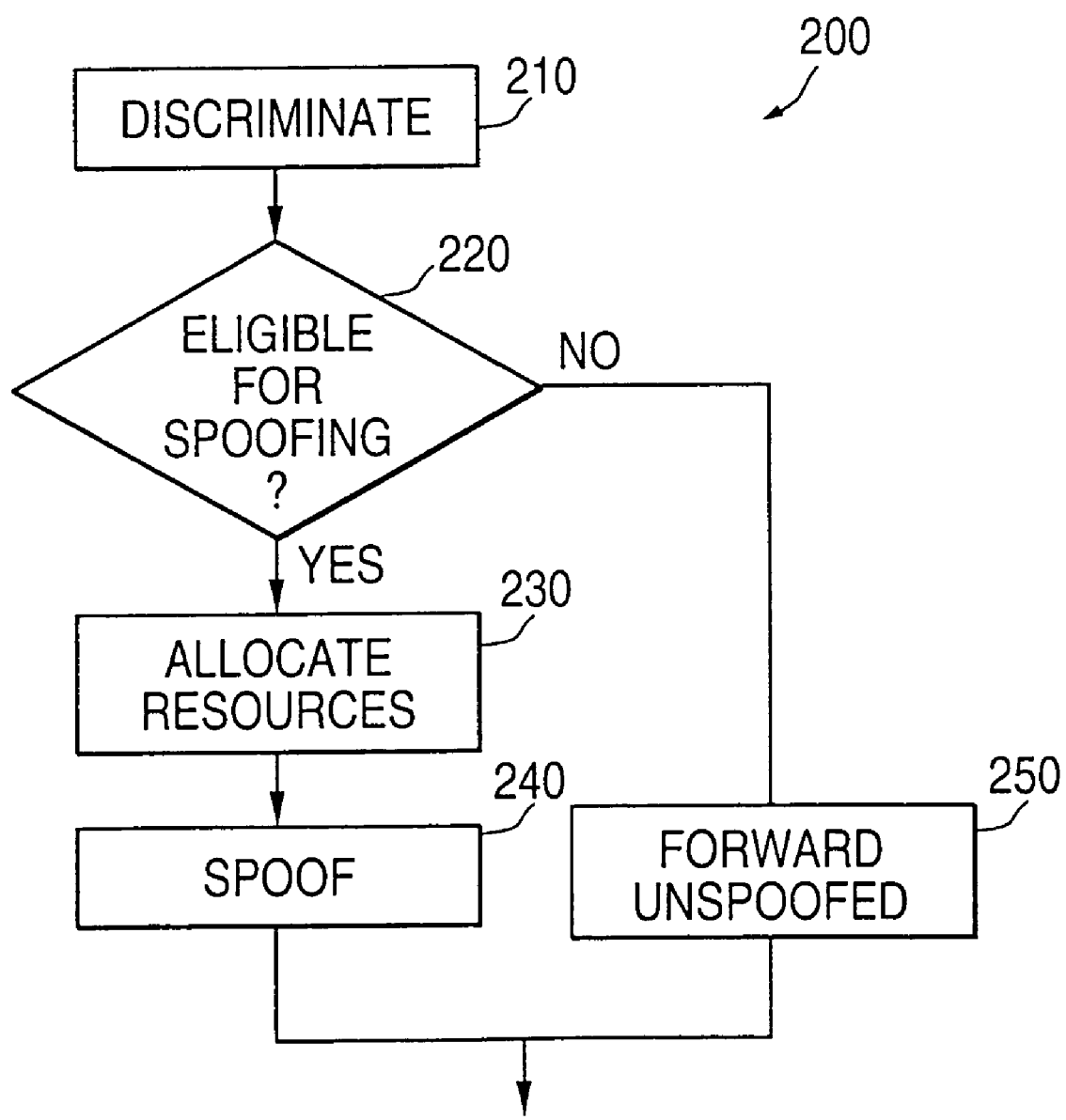

SELECTIVE SPOOFER AND METHOD OF PERFORMING SELECTIVE SPOOFING

CROSS-REFERENCE TO RELATED APPLICATIONS

This application claims the benefit under 35 U.S.C. § 119(e) of U.S. Provisional Application of John Border et al. entitled "Selective TCP Spoofing", Ser. No. 60/181,597, filed on Feb. 10, 2000, and a U.S. Provisional Application of John Border et al. entitled "Performance Enhancing Proxy", Ser. No. 60/220,026, filed on Jul. 21, 2000, the entire contents of both are incorporated by reference herein.

The present application is also related to co-pending application in the name of John Border et al., entitled "Performance Enhancing Proxy and Method for Enhancing Performance", filed concurrently herewith.

BACKGROUND OF THE INVENTION

The present invention is generally directed to a method and apparatus for performing selective spoofing of protocols on network paths, and more particularly, a method and apparatus for selective spoofing of the TCP/IP protocol on the Internet, to improve performance.

DESCRIPTION OF THE RELATED ART

The transmission control protocol (TCP) is the dominant protocol in use today on the Internet. TCP is carried by the Internet protocol (IP) and is used in a variety of applications including reliable file transfer and Internet web page access applications. The four layers of the TCP/IP protocol suite are illustrated in FIG. 1. As illustrated, the link layer (or the network interface layer) 10 includes device drivers in the operating system and any corresponding network interface cards. Together, the device driver and the interface cards handle hardware details of physically interfacing with any cable or whatever type of media is being used. The network layer (also called the Internet layer) 12 handles the movement of packets around the network. Routing of packets, for example, takes place at the network layer 12. IP, Internet control message protocol (ICMP), and Internet group management protocol (IGMP) may provide the network layer in the TCP/IP protocol suite. The transport layer 14 provides a flow of data between two hosts, for the application layer 16 above.

In the TCP/IP protocol suite, there are at least two different transport protocols, TCP and a user datagram protocol (UDP). TCP, which provides a reliable flow of data between two hosts, is primarily concerned with dividing the data passed to it from the application layer 16 into appropriately sized chunks for the network layer 12 below, acknowledging received packets, setting timeouts to make certain the other end acknowledges packets that are sent, and so on. Because this reliable flow of data is provided by the transport layer 14, the application layer 16 can ignore these details. UDP, on the other hand, provides a much simpler service to the application layer 16. UDP just sends packets of data called datagrams from one host to another, but there is no guarantee that the datagrams reach the other end. Any desired reliability must be added by the application layer 16.

The application layer 16 handles the details of the particular application. There are many common TCP/IP applications that almost every implementation provides. These include telnet for remote log-in, the file transfer protocol (FTP), the simple mail transfer protocol (SMTP) or electronic mail, the simple network management protocol (SNMP), and many others.

As described above, TCP provides reliable, in-sequence delivery of data between two IP hosts. The IP hosts set up a TCP connection, using a conventional TCP three-way handshake and then transfer data using a window based protocol with the successfully received data being acknowledged.

TCP was designed to be very flexible and works over a wide variety of communication links, including both slow and fast links, high latency links, and links with low and high error rates. However, while TCP (and other high layer protocols) works with many different kinds of links, TCP performance, in particular, the throughput possible across the TCP connection, is affected by the characteristics of the link in which it is used. There are many link layer design considerations that should be taken into account when designing a link layer service that is intended to support Internet protocols. However, not all characteristics can be compensated for by choices in the link layer design. TCP has been designed to be very flexible with respect to the links which it traverses.

An alternative to a tailored protocol is the use of performance enhancing proxies (PEPs), to perform a general class of functions termed "spoofing," in order to improve performance over impaired (i.e., high latency or high error rate) links. Spoofing involves an intermediate network device (the performance enhancing proxy (PEP)) intercepting and altering, through the addition and/or deletion of TCP (in this example) segments, the behavior of the TCP connection in an attempt to improve its performance.

TCP protocol throughput performance suffers in environments with long delays and/or high bit error rates. TCP spoofing is used to improve TCP throughput by locally acknowledging TCP data received and then taking on the responsibility for delivering the data, using mechanisms tailored for the particular environment. For example, as set forth above, TCP is often used when an application must reliably send data from one end system to another end system. The TCP "sender" includes sequence numbers in the data it sends. The TCP "receiver" uses the sequence numbers to acknowledge data it has received. If a data segment is lost in transit, the TCP sender will not receive an acknowledgement for the segment and will retransmit it.

The rate at which a TCP sender can send data to a TCP receiver is limited by a window. The window defines how much data the TCP sender can have "in flight" to the receiver (i.e., how much data can be outstanding, awaiting acknowledgement). The TCP sender dynamically adjusts the size of the window based on network conditions, but the window has an upper bound determined by the TCP receiver's advertised available buffer space. The TCP throughput possible with a particular window size is determined by the rate at which acknowledgments are received. With any particular window size, longer acknowledgment time means lower throughput. The time it takes for TCP data to be acknowledged is known as the TCP round trip time (RTT).

TCP spoofing is a technique used to improve TCP throughput in environments with long RTTs. An example of such an environment is an environment that includes a high latency link, such as a geosynchronous satellite link. TCP spoofing works by having a gateway at the edge of a high latency link "locally" acknowledging TCP data it receives. The local acknowledgments reduce the RTT perceived by the TCP sender, allowing the TCP sender to send more data more quickly, thereby improving throughput. The TCP spoofing gateway then uses protocol rules tailored for the high latency link for forwarding the data across the link. The TCP spoofing gateway also takes on the responsibility of retransmitting any packets lost after they have been acknowledged by the gateway. This can be done by buffering the data until an acknowledgment for the data is received from across the link and retransmitting data for which no acknowledgment is received.

As outlined above, conventional TCP spoofing implementations include the local acknowledgement of TCP data segments in order to get the TCP data sender to send additional data sooner than it would have sent if spoofing were not being performed, thus improving the throughput of the TCP connection. Generally, conventional TCP spoofing implementations have focused simply on increasing the throughput of the TCP connections either by using larger windows over the link or by using compression to reduce the amount of data which needs to be sent, or both.

However, not every application that desires reliable delivery of data requires a high throughput TCP connection. For example, a Telnet application typically operates by sending single messages back and forth between two end systems. These messages must be reliably delivered, but are small enough to each be sent in a single TCP segment. Another, more complex example is the file transfer protocol (FTP). An FTP application actually uses two TCP connections, one to send FTP control messages and the other to send data. The FTP application requires reliable delivery for both the control messages and the data. However, high throughput is required only for the data TCP connection, not for the control TCP connection.

Existing TCP spoofing implementations allocate TCP spoofing resources (i.e., buffer space, control blocks, etc.) dynamically as TCP connections are established and detected by the TCP spoofing gateway, without taking into account the type of application which is using the TCP connection. All TCP connections, regardless of whether or not they will benefit from spoofing (i.e., will benefit from the high throughput), are spoofed up until all the TCP spoofing resources have been allocated. Any additional TCP connections which are detected must pass through unspoofed, even if they are associated with applications which require high throughput.

SUMMARY OF THE INVENTION

The present invention is directed to a method and apparatus for enhancing the performance of a network.

The present invention is directed to a method and apparatus for enhancing the performance of a network by selectively spoofing connections, in particular, only spoofing connections for which spoofing will actually improve performance.

The selective spoofing functions of the present invention are applicable to a wide variety of communication links, including both slow and fast links, high latency links, and links with low and high error rates.

In one exemplary embodiment, the method and apparatus of the present invention discriminate among different connections and only apply spoofing resources (i.e., buffer space, control blocks etc.) to connections for which spoofing will actually improve performance. In one example, connections which can actually benefit from spoofing include connections with contain enough data to send to take advantage of the higher potential throughput. In one example, these connections are high speed, high data rate connections.

In another exemplary embodiment, which connections are spoofed is dynamically configurable either automatically or manually (via an operator), allowing the user or operator to decide which connections get improved performance based on local policy.

BRIEF DESCRIPTION OF THE DRAWINGS

FIG. 3 illustrates the operation of the selective spoofer of the present invention in one exemplary embodiment.

DETAILED DESCRIPTION OF THE PREFERRED EMBODIMENTS

Figure 1:
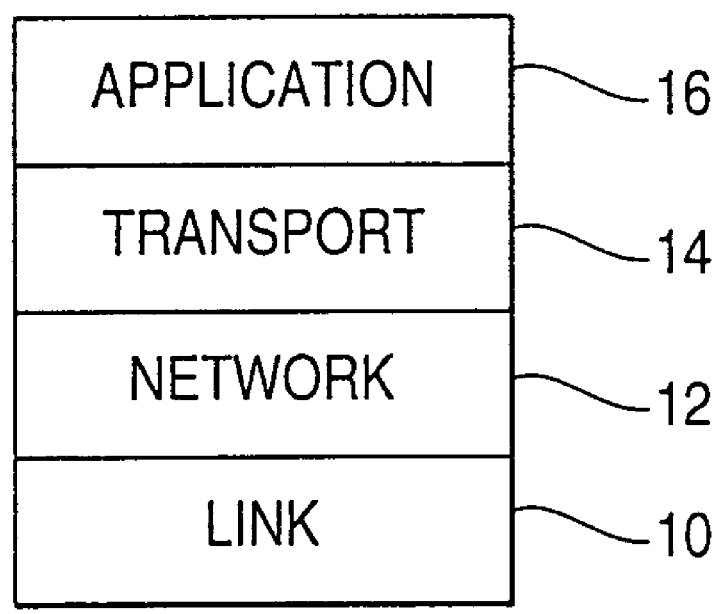
FIG. 1 illustrates the four layers of the conventional TCP/IP protocol suite.
Figure 2:
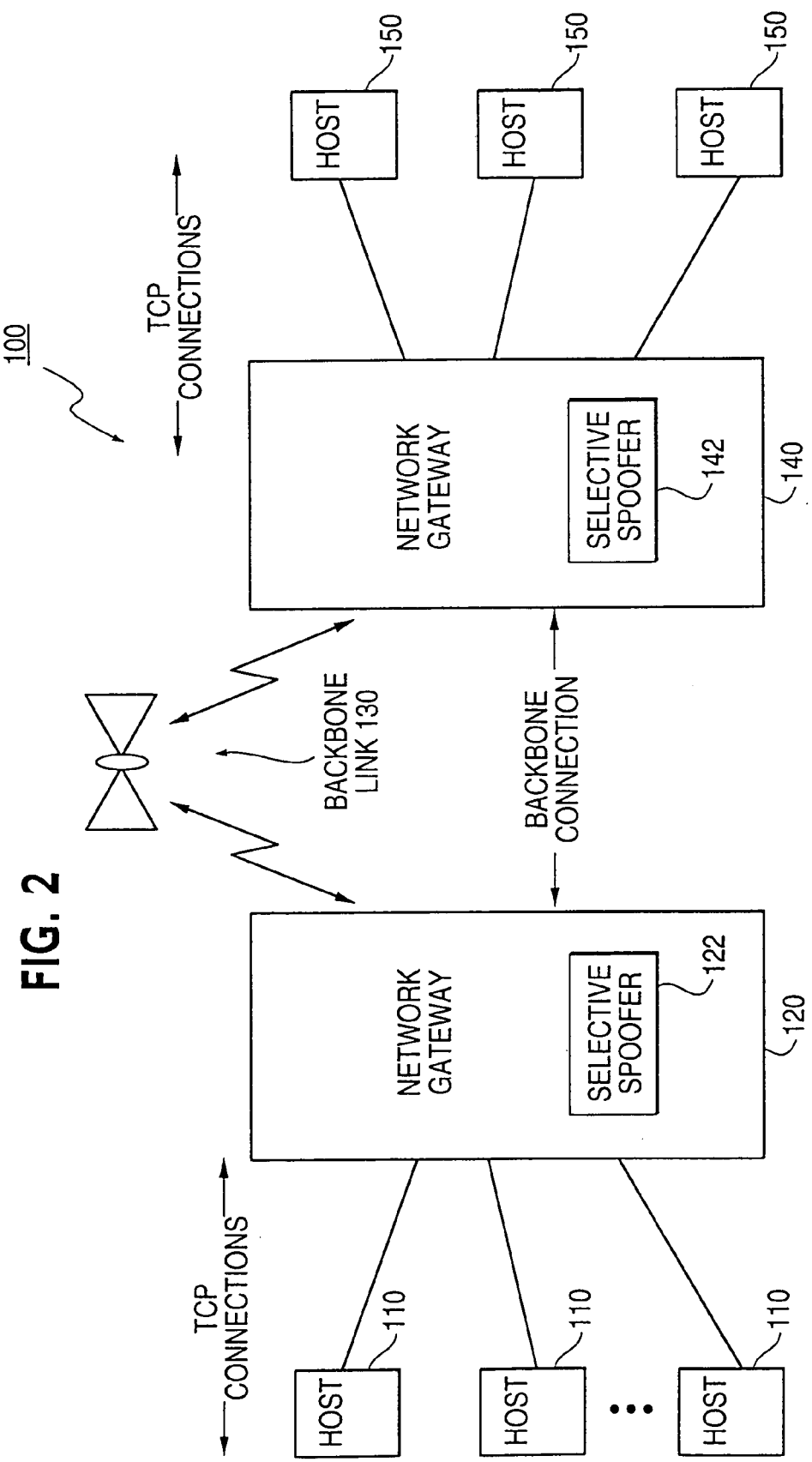
FIG. 2 illustrates an exemplary network in which the selective spoofer of the present invention is implemented.

FIG. 2 illustrates an exemplary network 100 in which the selective spoofer 122,142 of the present invention may be utilized. The network 100 in FIG. 2 includes a plurality of hosts 110 connected to a network gateway 120 via TCP connections. The network gateway 120 is connected to another network gateway 140 via a backbone connection on a backbone link 130. In FIG. 2, the backbone link 130 is depicted as a satellite link, however this is only exemplary. The network gateway 140 is further connected to a second group of hosts 150, also via TCP connections. In the arrangement illustrated in FIG. 2, the network gateways 120, 140 and their associated selective spoofers 122, 142 facilitate communication between the groups of hosts 110, 150.

The operation of the selective spoofer 122 is described below in conjunction with the flowchart 200 of FIG. 3. As set forth in step 210, the selective spoofer 122 discriminates among various TCP connections based on the applications using them. If the application is determined to be eligible for TCP spoofing in step 220, then TCP resources are allocated (step 230) and TCP spoofing is performed (step 240). If the connection is not eligible for spoofing in step 220, it is forwarded unspoofed (step 250).

As a result, the selective spoofer 122 conserves TCP spoofing resources for only those TCP connections for which high throughput is required. The selective spoofer 122 also increases the number of TCP connections which can be active before running out of TCP spoofing resources, since any active TCP connections which do not require high throughput will not be allocated spoofing resources.

In the discriminating step 210, a variety of criterion may be used. In one example, the criterion for identifying TCP connections that are eligible for spoofing is the TCP port number field contained in the TCP packets being sent. In general, unique port numbers are assigned to each type of application. Which TCP port numbers should and should not be spoofed can be stored in the selective spoofer 122. The selective spoofer 122 is also re-configurable to allow a user or operator to reconfigure the TCP port numbers which should and should not be spoofed. The selective spoofer 122 also permits a user or operator to control which TCP connections are to be spoofed based on other criteria. In general, a decision on whether to spoof a TCP connection may be based on any field within a TCP packet. The selective spoofer 122 permits a user to specify which fields to examine and which values in these fields identify TCP connections that should or should not be spoofed.

Another example of a potential use for this capability is for the user or operator to select the IP address of the TCP packet in order to control for which users TCP spoofing is performed. The selective spoofer 122 also permits a user to look at multiple fields at the same time. As a result, the selective spoofer 122 permits a user or operator to use multiple criteria for selecting TCP connections to spoof. For example, by selecting both the IP address and the TCP port number fields, the system operator can enable TCP spoofing for only specific applications from specific users.

The user configurable rules may include five exemplary criteria which can be specified by the user or operator in producing a selective TCP spoofing rule:

Destination IP address;
Source IP address;
TCP port numbers (which may apply to both the TCP destination and source port numbers);
TCP options; and
IP differentiated services (DS) field.

As outlined above, in addition to supporting selective TCP spoofing rules for each of these criterion, AND and OR combination operators can be used to link criteria together. For example, using the AND combination operator, a rule can be defined to disable TCP spoofing for FTP data received from a specific host. Also, the order in which the rules are specified may be significant. It is possible for a connection to match the criteria of multiple rules. Therefore, the selective spoofer 122 can apply rules in order specified by the operator, taking the action of the first rule that matches. A default rule may also be set which defines the action to be taken for TCP connections which do not match any of the defined rules. The set of rules selected by the operator may be defined in a selective TCP spoofing selection profile.

As an example, assume enough buffer space has been allocated to spoof five (5) TCP connections. If four (4) low speed applications (i.e. applications which, by their nature, do not require high speed) bring up connections along with one high speed application, the high speed connection has access to only ⅕ the available spoofing buffer space. Further, if five (5) low speed connections are brought up before the high speed connection, the high speed connection cannot be spoofed at all. Using the selective spoofer 122, the low speed connections are not allocated any spoofing buffer space. Therefore, the high speed connection always has access to all of the buffer space, improving its performance with respect to an implementation without the selective spoofer 122.

In summary, the selective spoofer 122 of the present invention adds to conventional spoofing the ability to discriminate among different TCP connections and only allocate TCP spoofing resources to those connections for which spoofing will actually improve performance.

Although the present invention has been described in conjunction with exemplary FIGS. 2–3, the present invention may be varied in many ways obvious to one of ordinary skill in the art. For instance, although the present invention describes spoofing some connections based on their associated applications, any other performance enhancing function known to one of ordinary skill in the art could also be implemented.

Similarly, although the various parameters discussed above in conjunction with FIGS. 2–3 include destination address, source address, destination port number, source port number, options, a differentiated services (DS) field, and type of data contained therein, any other parameters known to one of ordinary skill in the art could also be utilized.

Further, although the network parameter being improved above is throughput, selective spoofing could be employed to improve any other network parameter known to one of ordinary skill in the art.

Further, the selective spoofing performance enhancing function may be implemented alone or in conjunction with other performance enhancing functions, including, but not limited to three-way handshake spoofing, local data acknowledgement, TCP Connection to Backbone Connection Multiplexing, data compression/encryption, connection prioritization, and connection path selection.

Further, although the present invention has been described above using the TCP, TCP/IP, or UDP protocols, any high layer protocol known to one of ordinary skill in the art could also be utilized. Although the present invention has been described above in conjunction with a satellite link, any impaired link, that is any link with at least one potentially negative parameter (high latency, high bit error rate, etc.) could also benefit from selective TCP spoofing features of the present invention. Although the various selective TCP spoofing features of the present invention have been described as taking place within a network gateway, these functions could be performed within any network element, including, but not limited to, a host, a hub, a VSAT, a switch, and a router.

Further, although the functionality described above in conjunction with the present invention has been described as being originally resident within a network element, the functionality may be added to an existing network element, via software loaded from an article of manufacture or software downloaded via a propagated signal.

What is claimed is:

1. A apparatus comprising:
   a selective spoofing unit that decides whether or not to perform transport level spoofing on a transport level connection to said apparatus, wherein said selective spoofing unit decides to perform transport level spoofing in accordance with a determination that the transport level connection is for use in sending FTP data, and said selective spoofing unit decides not to perform transport level spoofing in accordance with a determination that the transport level connection is for use in sending FTP control messages.

2. The apparatus of claim 1, wherein said spoofing unit assigns spoofing resources, including buffer space and control blocks, to the spoofed transport level connection.

3. The apparatus of claim 1, wherein the transport level connection uses one of the Transmission Control Protocol (TCP) and the User Datagram Protocol (UDP).

4. The apparatus of claim 1, wherein said apparatus is connected to another apparatus via a backbone connection.

5. The apparatus of claim 4, wherein the backbone connection is via a wireless link.

6. The apparatus of claim 5, wherein the wireless link has high latency and high error rate.

7. The apparatus of claim 5, wherein the wireless link is a satellite link.

8. The apparatus of claim 1, wherein said apparatus is a component of a network gateway.

9. he apparatus of claim 1, wherein said apparatus is a component of a host.

10. The apparatus of claim 1, wherein said apparatus is a component of a hub.

11. The apparatus of claim 1, wherein said apparatus is a component of a switch.

12. The apparatus of claim 1, wherein said apparatus is a component of a VSAT.

13. The apparatus of claim 1, wherein said apparatus is a component of a router.

14. A method comprising:
 performing transport level spoofing on a transport level connection for use in sending FTP data, but not performing transport level spoofing on a transport level connection for use in sending FTP control messages.

15. The method of claim 14, wherein said spoofing step assigns spoofing resources, including buffer space and control blocks, to a spoofed transport level connection.

16. The method of claim 14, wherein said method is performed in a network gateway.

17. The method of claim 14, wherein said method is performed in a host.

18. The method of claim 14, wherein said method is performed in a hub.

19. The method of claim 14, wherein said method is performed in a switch.

20. The method of claim 14, wherein said method is performed in a VSAT.

21. The method of claim 14, wherein said method is performed in a router.

22. The apparatus of claim 1, wherein the transport level connection is a TCP connection.

* * * * *